March 2, 1971 J. JÄCKEL ET AL 3,566,431
WINDSHIELD WIPER ASSEMBLY
Filed Dec. 31, 1968 4 Sheets-Sheet 1

INVENTORS
Johann JACKEL
Erich KOLB
Hubert MAINKA

BY
their ATTORNEY

March 2, 1971    J. JÄCKEL ET AL    3,566,431
WINDSHIELD WIPER ASSEMBLY
Filed Dec. 31, 1968    4 Sheets-Sheet 2
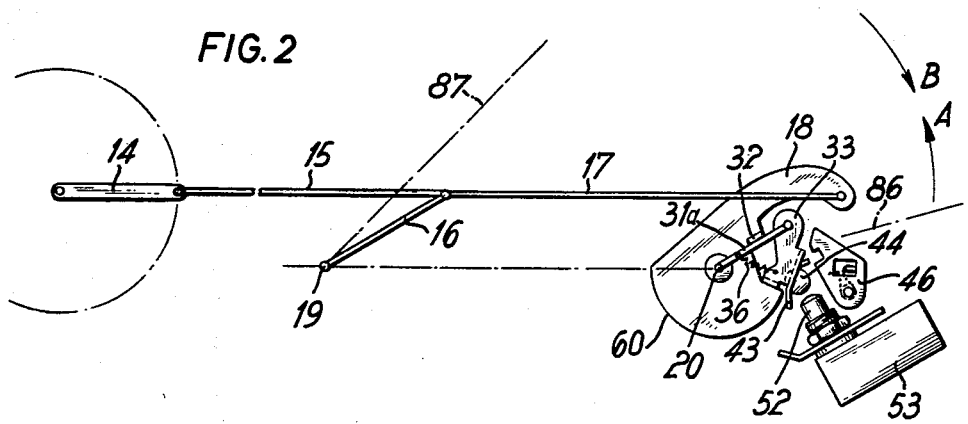
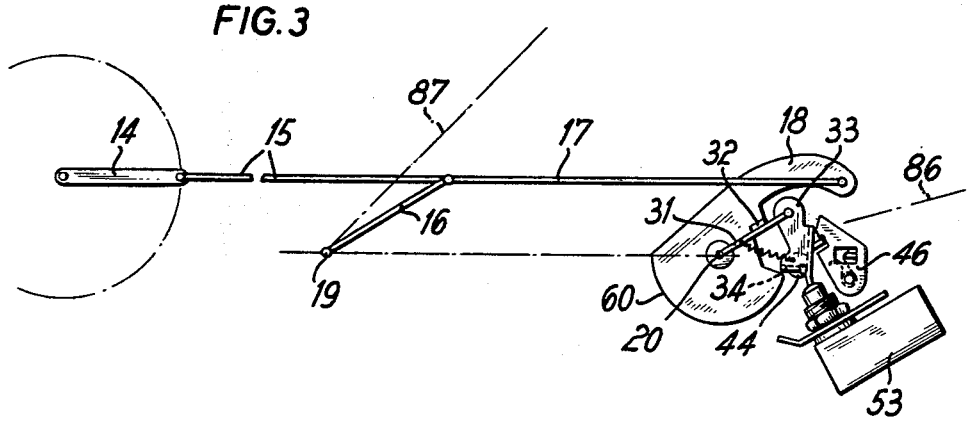
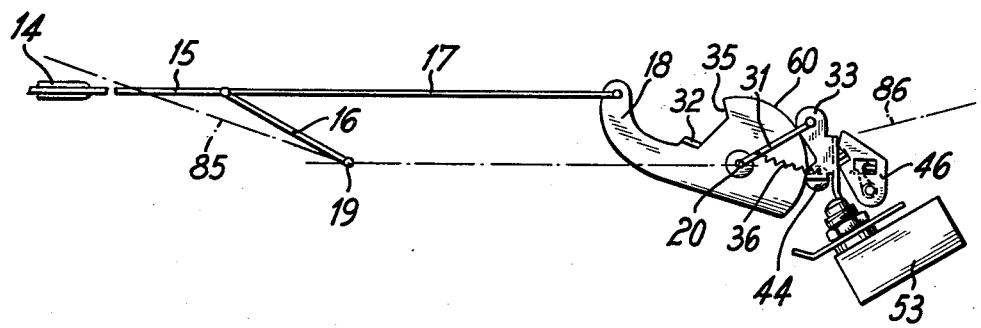
INVENTORS:
Johann JÄCKEL
Erich KOLB
Hubert MAINKA
BY
their ATTORNEY INVENTORS:
Johann JÄCKEL
Erich KOLB
Hubert MAINKA their ATTORNEY INVENTORS:
Johann JÄCKEL
Erich KOLB
Hubert MAINKA Their ATTORNEY United States Patent Office 3,566,431
Patented Mar. 2, 1971

3,566,431
WINDSHIELD WIPER ASSEMBLY
Johann Jäckel, Baden-Baden, Erich Kolb, Eisenthal, Buhl, and Hubert Mainka, Buhlertal, Germany, assignors to Robert Bosch G.m.b.H., Stuttgart, Germany
Filed Dec. 31, 1968, Ser. No. 788,126
Claims priority, application Germany, Jan. 13, 1968,
P 16 55 964.1
Int. Cl. A47l 1/00; B60s 1/02
U.S. Cl. 15—250.17
15 Claims

ABSTRACT OF THE DISCLOSURE

A windshield wiper assembly wherein two blades move back and forth in the same direction when the assembly is in use, wherein one of the blades is started with a delay following starting of the other blade, and wherein the one blade comes to rest in parking position while the other blade continues to move toward parking position to thereby effect stoppage of the drive. The means for moving the one blade comprises a coupling which is mounted externally of the prime mover of the windshield wiper assembly.

BACKGROUND OF THE INVENTION

The present invention relates to windshield wiper assemblies in general, and more particularly to improvements in windshield wiper assemblies wherein the wiper blades move back and forth in the same direction and come to rest in parking positions when the assembly is arrested. In such assemblies, one of the wiper blades must be disconnected from the drive ahead of the other blade and the other blade must be started ahead of the one blade in order to insure that both blades come to rest in identical parking positions and that both blades move in the same direction when the assembly is in use.

In presently known windshield wiper assemblies of the above outlined character, delayed engagement of the one blade and advanced disengagement of such one blade from the drive is brought about by a coupling which is installed in the transmision of the drive. The parts of the coupling must move axially with reference to each other and the movement of such parts away from engagement with each other requires the exertion of a substantial force because the disengagement takes place while the parts transmit torque to the components which effect movements of the one blade. Thus, disengagement of parts which constitute the coupling in the transmission of a conventional windshield wiper assembly must be carried out by overcoming substantial frictional forces. This contributes to bulkiness, cost and sensitivity of conventional transmissions. The cost of such transmissions is much higher than the cost of transmissions which were not provided with a coupling.

SUMMARY OF THE INVENTION

An object of the present invention is to provide a windshield wiper assembly wherein the aforedescribed mode of moving the wiper blades can be achieved by employing a drive whose transmission is of conventional design and need not embody a coupling.

Another object of the invention is to provide a windshield wiper assembly wherein advanced disengagement and delayed engagement between the prime mover and one of the blades can be brought about by exertion of very small forces and by employing a coupling which need not be installed in the transmission.

A further object of the invention is to provide a simple drive for the blades of the just outlined windshield wiper assembly.

An additional object of the invention is to provide a novel electric circuit for the drive and other parts of the improved windshield wiper assembly.

An ancillary object of the invention is to provide a novel coupling for use in our windshield wiper assembly.

The improved windshield wiper assembly comprises first and second rocker means pivotable about first and second axes located at a level below a windshield, first and second wiper arms which are respectively pivotable about the first and second axes and respectively carry first and second wiper blades for movement between parking and second positions, the first wiper arm being arranged to share all movements of the first rocker means, drive means for moving the rocker means back and forth through angles of predetermined magnitude whereby the first rocker means pivots the first blade between parking and second positions, engageable and disengageable coupling means for connecting the second wiper arm with the second rocker means to thereby pivot the second wiper blade between parking and second positions, arresting means for stopping the drive means in parking position of the first blade, and control means for engaging and disengaging the coupling means in the second position of the first blade so that the second blade remains in parking position during initial movement of the first blade from parking to second position on starting of the drive means and that the second blade rests in parking position during last movement of the first blade from second to parking position whereupon the arresting means arrests the drive means so that both blades dwell in parking positions when the drive means is idle.

The coupling means preferably comprises third rocker means pivotable about the second axis and arranged to transmit pivotal movements to the second wiper arm, and a coupling member arranged to connect the second rocker means with the third rocker means when the coupling means is engaged so that the third rocker means then shares movements of the second rocker means in one direction about the second axis. The coupling means further comprises a pair of shoulders which are respectively provided on the second and third rocker means and have surfaces which abut against each other when the coupling means is engaged and the second rocker means pivots in the other direction about the second axis so that the third rocker means is then compelled to share such movement of the second rocker means.

The novel features which are considered as characteristic of the invention are set forth in particular in the appended claims. The improved windshield wiper assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a somewhat schematic front elevational view of certain parts of drive means for the rocker means in a first position;

FIG. 3 illustrates the parts of FIG. 2 in a second position;

FIG. 4 shows the parts of FIG. 2 in a third position;

DESCRIPTION OF THE PREFERRED EMBODIMENTS

Figure 1:
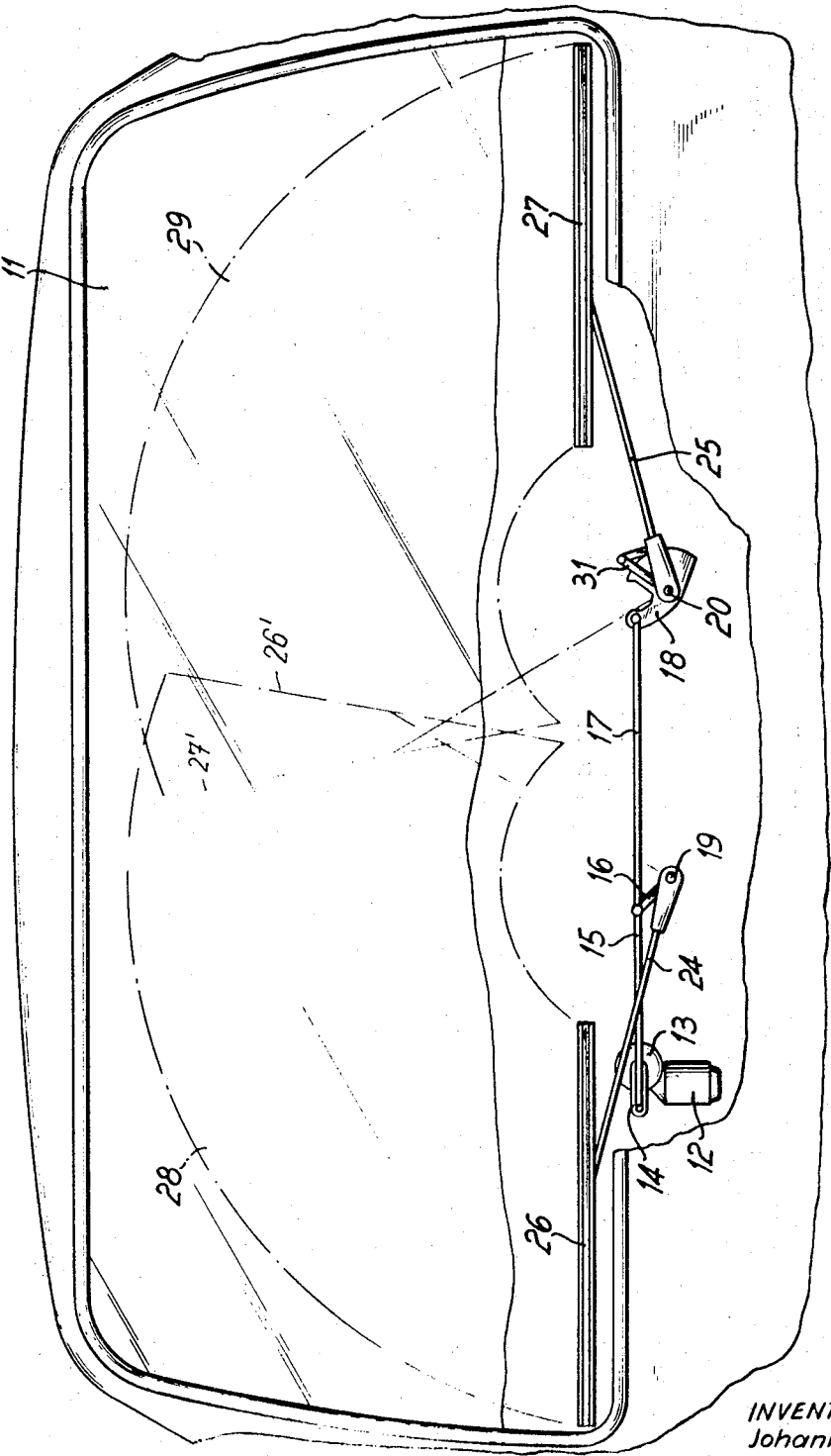
FIG. 1 is a front elevational view of a windshield wiper assembly which embodies one form of the invention, the second positions of the wiper blades being indicated by phantom lines.

Referring to FIG. 1, the improved windshield wiper assembly is utilized to wipe a windshield 11 in an automotive vehicle. The assembly comprises a drive including a prime mover composed of an electric motor 12 and a transmission 13 which preferably includes a worm and a mating worm wheel. The rotary crank arm 14 constitutes the output member of the transmission 13 and is articulately coupled to one end of a first motion transmitting rod 15 the other end of which is articulately coupled to a first rocker 16 secured to a first pivot member 19. A second motion transmitting rod 17 connects the rocker 16 with a second rocker 18 which is turnable on a second pivot member 20. The pivot members 19 and 20 are rotatable in bearing sleeves 21 and 22 (FIG. 7) which are carried by a main support here shown as a rail 23. The latter is installed adjacent to the lower edge of the windshield 11. The pivot members 19, 20 are respectively rigid with and turnable relative to wiper arms 24, 25 whose outer ends carry wiper blades 26, 27.

When the windshield wiper assembly is in operation, the blades 26, 27 travel in the same direction so that the blade 26 leaves the solid-line parking position of FIG. 1 when the blade 27 begins to move toward its solid-line parking position, and vice versa. These blades extend substantially vertically when they reach their second or inner end positions 26', 27'. The areas which are respectively swept by the blades 26, 27 are shown at 28 and 29. These areas overlap in the middle of the windshield 11. When the windshield wiper assembly is arrested, the blades 26, 27 come to rest in their parking positions. This is achieved by the provision of a novel coupling which transmits motion to the blade 27 but remains inoperative when the assembly is started and the motor 12 causes the blade 26 to move from the parking position to the second position 26'. Also, the just mentioned coupling disconnects the blade 27 from the motor 12 ahead of the blade 26 so that the blade 27 rests in the parking position while the blade 26 continues to pivot alone to return to its parking position. Thus, the blade 26 begins to move ahead of the blade 27 and the blade 27 comes to a halt ahead of the blade 26.

Figure 5:
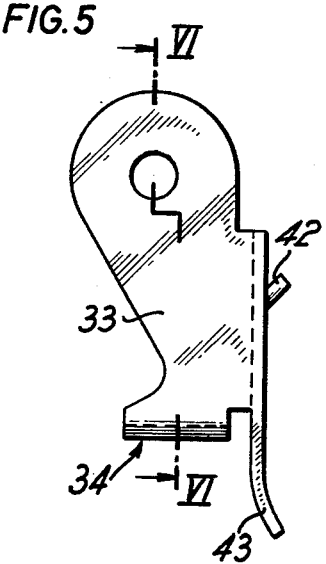
FIG. 5 is an enlarged elevational view of the coupling member.

The pivot member 20 is rigid with a third rocker 31 which forms part of the aforementioned coupling. The rocker 31 can be coupled to and then shares pivotal movements of the rocker 18. In this way, the rocker 31 can transmit motion from the rod 17 to the arm 25 of the blade 27. The rocker 18 has a shoulder 32 provided with a surface which abuts against the adjoining surface 31a of the rocker 31 to pivot the latter in a clockwise direction when the rocker 18 pivots in the direction indicated by the arrow B (FIG. 2). In order to insure that the rocker 31 can share pivotal movement of the rocker 18 in the opposite direction (arrow A in FIG. 2), there is provided a coupling member or pawl 33 which is pivotally mounted on the rocker 31 and has a coupling portion 34 (see FIG. 5) which can engage a complementary coupling portion 35 (FIG. 4) on the rocker 18. A spring 36 operates between the pawl 33 and rocker 31 and tends to maintain the coupling portion 34 in engagement with the coupling portion 35 to thereby connect the rocker 31 to the rocker 18.

Figure 6:
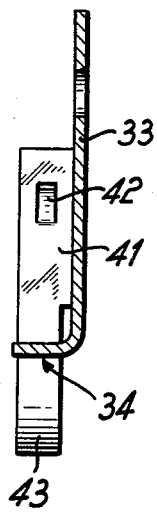
FIG. 6 is a sectional view of the coupling member as seen in the direction of arrows from the line VI—VI of FIG. 5.

The pawl 33 is provided with a bent-over cheek 41 (FIG. 6) which has a projection or tongue 42, and with a downwardly projecting extension 43. The cheek 41 cooperates with a disengaging member 44 which constitutes the armature of an electromagnet 45 affixed to the rail 23. When the electromagnet 45 is deenergized, the armature 44 extends into the path of movement of the cheek 41 to thereby disengage the coupling portion 34 from the coupling portion 35 while the rocker 18 turns in the direction of arrow B (see FIG. 3).

Figure 7:
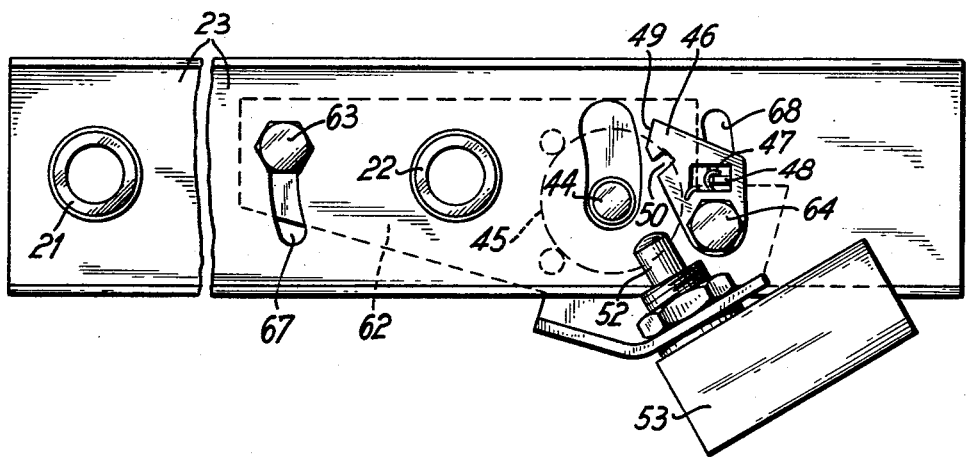
FIG. 7 is a fragmentary front elevational view of the main support of the windshield wiper assembly, drawn to actual size, and further showing certain parts of the control means.
Figure 8:
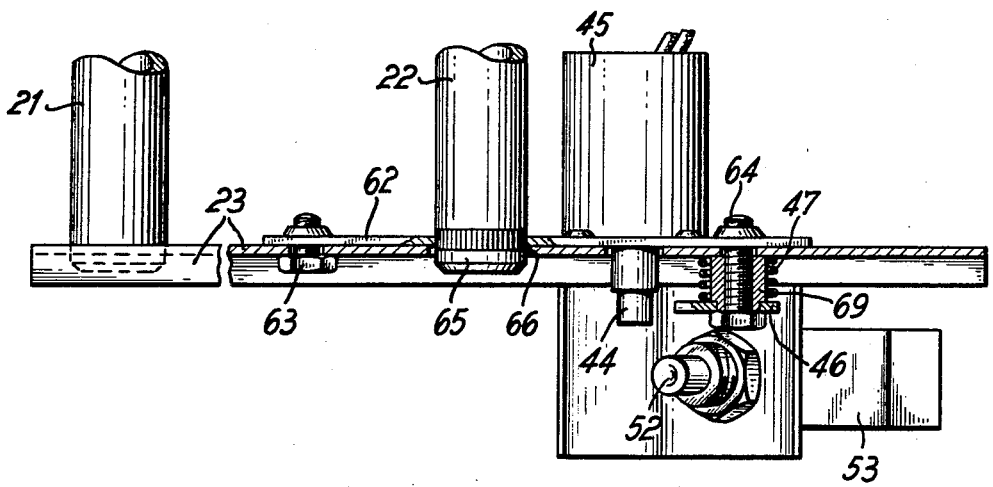
FIG. 8 is a top plan view of the structure shown in FIG. 7 with certain parts shown in a horizontal sectional view.

The tongue 42 cooperates with a retaining lever 46 which is pivotably secured to the rail 23 and is biased by a torsion spring 47 (see FIGS. 7 and 8). The spring 47 biases the lever 46 in a counterclockwise direction, as viewed in FIG. 7, and into engagement with a fixed abutment 48. The lever 46 has an inclined guide face 49 for the tongue 42. The latter engages the guide face 49 when the armature 44 causes the coupling member 33 to turn in a counterclockwise direction, as viewed in FIGS. 2 to 4. The tongue 42 then pivots the lever 46 in a clockwise direction and ultimately enters a notch 50 of the lever 46 (see FIG. 7).

The extension 43 cooperates with the movable contact 52 of a control switch 53 which is affixed to the rail 23. The control switch 53 is connected in circuit with the motor 12 (see FIG. 9). When the armature 44 of the electromagnet 45 disengages the pawl 33 and the rocker 31 assumes the position shown in FIGS. 3–4, the extension 43 depresses the movable contact 52 to close the control switch 53.

The rocker 18 is provided with a control cam 60 which cooperates with the pawl 33. The cam 60 disengages the pawl 33 from the armature 44 when the pawl is in disengaged position and the rocker 18 pivots in a counterclockwise direction (see FIG. 4). The aforementioned bearing sleeve 22 is mounted on the rail 23 by way of a carrier plate 62 which is secured to the rail by screws 63 and 64. The front end portion 65 of the sleeve 22 extends with small clearance into a bore 66 of the rail 23. The stems of the screws 63, 64 extend through arcuate slots 67, 68 which are provided in the rail 23. When the screws 63, 64 are loosened, the carrier plate 62 can be pivoted about the axis of the bearing sleeve 22 through an angle which is determined by the length of the slots 67, 68. This carrier plate supports the electromagnet 45, the control switch 53 and the aforementioned retaining lever 46. The latter is mounted on a sleeve 69 (FIG. 8) which accommodates the stem of the screw 64. The abutment 48 for the lever 46 is a tongue which forms a bent-over part of the carrier plate 62 and extends through the slot 68 of the rail 23. The abutment 48 has been omitted in FIG. 8 for the sake of clarity. The mutual positions of the parts 45, 53 and 46 remain unchanged when the carrier plate 62 is caused to change its angular position with reference to the rail 23 by pivoting about the axis of the bearing sleeve 22. The purpose of such adjustability of the plate 62 will be explained hereinafter.

Figure 9:
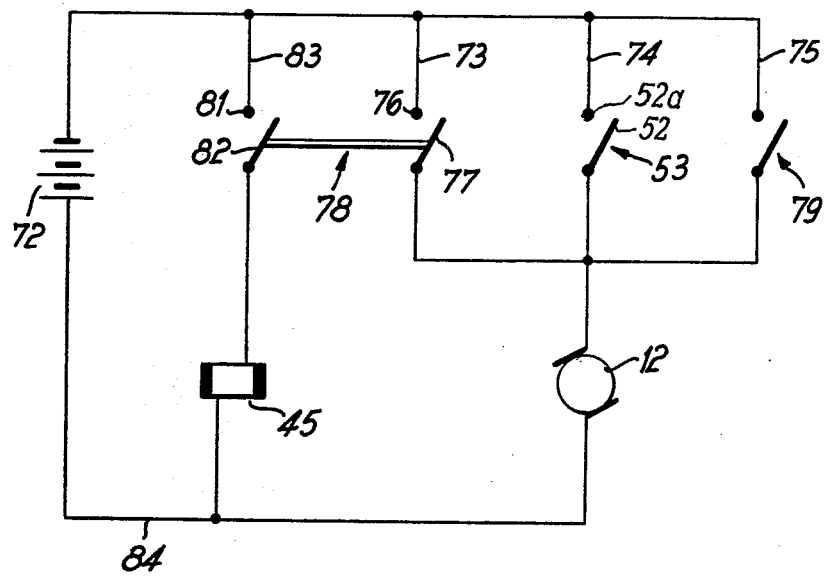
FIG. 9 illustrates the electric circuit of the windshield wiper assembly.

The circuit of the motor 12 further includes an energy source 72, preferably a battery (see FIG. 9) one pole of which is connected with the motor by way of three conductors 73, 74, 75. The conductor 73 accommodates the contacts 76, 77 of a manually operated switch 78 which is the master switch of the windshield wiper assembly and serves to start or to initiate stoppage of the operation. The contacts 52, 52a of the aforementioned control switch 53 are installed in the conductor 74. The conductor 75 accommodates the contacts of an arresting switch 79 which is operated by the transmission 13. The switch 79 is opened by the transmission 13 when the wiper blade 26 assumes the solid-line parking position of FIG. 1. This switch 79 closes automatically as soon as the blade 26 leaves such parking position. The manually operated master switch 78 comprises a second pair of contacts 81, 82 which are connected in a conductor 83. The contact 82 closes in response to closing of the contact 77. The electromagnet 45 is connected with one pole of the battery 72 by the conductor 83 and with the other pole of the battery by a further conductor 84. FIG. 9 illustrates the switches 53, 78, 79 in open positions; this corresponds to inoperative condition of the windshield wiper assembly in which the blades 26, 27 are held in their respective parking positions. The drive means 12–14, 15, 17 of the assembly then assumes the position shown in FIG. 4. The corresponding positions of the wiper arms 24, 25 are denoted in FIG. 4 by the phantom lines 85, 86.

THE OPERATION

In order to start the windshield wiper assembly, the operator closes the master switch 78, for example, by turning or depressing a knob on the dashboard of the vehicle. The circuit of the motor 12 is then completed by way of the conductor 73 so that the transmission 13 begins to rotate the crank arm 14. At the same time, the master switch 78 closes its contact 82 so that the electromagnet 45 is energized and moves its armature 44 away from the path of movement of the pawl 33. The wiper blade 26 leaves its parking position as soon as the circuit of the motor 12 is completed via conductor 73 and reaches its inner end position when the crank arm 14 completes one-half of a revolution. The corresponding position of the wiper arm 24 is indicated in FIG. 2 by the phantom line 87. During such initial phase of operation of the wind-wiper assembly, the blade 27 remains in the parking position because the rocker 18 is not coupled to the rocker 31 by way of the pawl 33. The retaining lever 46 holds the rocker 31 by way of the pawl 33 in that position which corresponds to parking position of the blade 27. Withdrawal of armature 44 from the path of movement of pawl 33 does not immediately bring about a shield wiper assembly, the blade 27 remains in the parking pivotal movement of pawl 33 to coupling position because cam 60 of the rocker 18 holds the pawl in disengaged position.

When the blade 26 reaches the inner end position (see the position 87 of the crank arm 15 in FIG. 2), the cam 60 releases the pawl 33 so that the latter can follow the bias of the spring 36 and moves its coupling portion 34 into engagement with the coupling portion 35 of the rocker 18. From then on, the wiper arm 25 and the rocker 31 are coupled to and share all pivotal movements of the rocker 18. When the pawl 33 moves to coupling position, it releases the movable contact 52 of the control switch 53 so that this switch closes and completes the circuit of the motor 12 by way of the conductor 74. The master switch 78 remains in closed position so that the motor circuit is completed by way of the conductors 73 and 74. The motor 12 drives the blades 26, 27 in the same direction, i.e., in the direction of arrow A or arrow B. The arresting switch 79 opens whenever the blade 26 reaches its parking position; however, this does not affect the motor circuit which remains completed by way of the conductor 74 and control switch 53.

In order to arrest the windshield wiper assembly, the operator opens the master switch 78. The motor 12 continues to rotate because the control switch 53 remains closed; however, opening of the contact 82 causes de-energization of the electromagnet 45 so that the armature 44 is free to move into the path of the pawl 33. When the blades 26, 27 pivot in the direction indicated by arrow B subsequent to opening of the master switch 78, the pawl 33 is gradually disengaged from the rocker 18 by the armature 44 and ultimately assumes the position shown in FIG. 3. Such gradual disengagement takes place while the pawl 33 need not transmit torque because the rocker 31 is then pivoted by the shoulder 32 of the rocker 18. Thus, the armature 44 must only overcome the bias of the spring 36. This spring is preferably weak so that the disengagement of pawl 33 can be effected with a minimum of effort. When the pawl 33 is disengaged, its extension 43 engages the movable contact 52 and opens the control switch 53. This does not immediately result in stoppage of the motor 12 because the motor circuit remains completed by way of the conductor 75 and arresting switch 79. Thus, the blade 27 remains in parking position and the blade 26 moves toward parking position whereby the transmission 13 opens the arresting switch 79 and arrests the motor 12 when the blade 26 reaches its parking position. The blades 26, 27 thereupon remain in parking positions and cannot be moved away from such positions excepting by renewed closing of the master switch 78.

Since the parts 45, 46 and 53 are mounted on the carrier plate 62 which is adjustable with reference to the rail 23, the drive means and the coupling of the improved windshield wiper assembly can be used to operate wiper blades which must move through angles of desired magnitude. Thus, by changing the position of the carrier plate 62, one can determine the exact moment when the pawl 33 starts to become disengaged from the rocker 18. In this way, the person in charge can select the parking position of the blade 27.

Of course, the improved windshield wiper assembly is susceptible of many additional modifications without departing from the spirit of our invention. For example, the armature 44 of the electromagnet 45 can be replaced by a disengaging member which need not be operated by an electromagnet. Such disengaging member can be coupled to the master switch 78 by a Bowden wire or by a suitable linkage. Also, the shoulder 32 of the rocker 18 can be replaced by a second pawl or by an analogous coupling member which can connect the rocker 31 to the rocker 18 for movement in the direction indicated by arrow B. The pawl 33 can be mounted on the rocker 18 to engage or to be disengaged from the rocker 31. Furthermore, the drive means can be used with equal advantage in windshield wiper assemblies wherein the parking positions of the wiper blades are their inner end positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A windshield wiper assembly comprising first and second rocker means pivotable about first and second axes; first and second wiper arm means respectively pivotable about said first and second axes, said first arm being arranged to share all movements of said first rocker means; first and second wiper blades respectively carried by said first and second arms for movement therewith between parking and second positions; drive means for moving said rocker means back and forth through angles of predetermined magnitude whereby said first rocker means pivots said first blade between parking and second positions; engagable and disengageable coupling means for connecting said second arm with said second rocker means to thereby pivot said second blade between parking and second positions, said coupling means comprising third rocker means pivotable about said second axis and arranged to transmit pivotal movement to said second wiper arm and a coupling member arranged to connect said second rocker means with said third rocker means so that said third rocker means then shares movement of said second rocker means in one direction about said second axis; arresting means for stopping said drive means in parking position of said first blade; and control means for engaging and disengaging said coupling means in the second position of said first blade so that the second blade remains in parking position during initial movement of the first blade from parking to second position and that the second blade rests in parking position during last movement of the first blade from second to parking position.

2. An assembly as defined in claim 1, wherein said coupling member is articulately connected with one of said second and third rocker means and comprises a first coupling portion engageable with a second coupling portion on the other of said second and third rocker means.

3. An assembly as defined in claim 2, wherein said first coupling portion is pivotable into and from engagement with said second coupling portion, said control means comprising a disengaging member movable into the path of movement of said first coupling portion to thereby disengage the latter from said second coupling portion.

4. An assembly as defined in claim 1, wherein said coupling means further comprises a pair of surfaces respectively provided on said second and third rocker means, said surfaces abutting against each other during movement of said second rocker means in the other direction about said second axis so that said third rocker means shares such movement of the second rocker means.

5. An assembly as defined in claim 1, wherein said coupling member is articulately connected with said third rocker means, said control means comprising switch means which is actuated by said coupling member when the latter is disconnected from the second rocker means.

6. An assembly as defined in claim 1, wherein said control means comprises retaining means for holding said coupling member upon disengagement from said other rocker means.

7. An assembly as defined in claim 6, wherein said retaining means comprises a pivotable lever having a guide face along which a portion of said coupling member slides on disengagement from said other rocker means, and resilient means for biasing said lever against said portion of the coupling member.

8. An assembly as defined in claim 1, wherein said control means comprise a disengaging member movable into the path of movement of said coupling member to thereby disengage said coupling member from said other rocker means and electromagnet means having an armature constituting said disengaging member.

9. An assembly as defined in claim 8, wherein said drive means comprises an electric motor and said control means comprises means for preparing said motor for stoppage, said preparing means including means for deenergizing said electromagnet and for thereby moving said armature into the path of movement of said coupling member to effect disengagement of said second and third rocker means in second position of said first blade.

10. An assembly as defined in claim 9, wherein said control means further comprises cam means provided on the other of said second and third rocker means and arranged to disengage said coupling member from said armature upon completion of initial movement of said first blade to second position.

11. An assembly as defined in claim 1, wherein said control means comprises a disengaging member movable into the path of movement of said coupling member to disengage said coupling member from said other rocker means, and carrier means for said control means and said disengaging member.

12. An assembly as defined in claim 11, further comprising main support means for said rocker means and said carrier means, and means adjustably securing said carrier means to said main support means.

13. An assembly as defined in claim 12, wherein said carrier means is turnable about said second axis.

14. An assembly as defined in claim 13, further comprising a bearing member pivotable about said second axis and rigid with said carrier means.

15. An assembly as defined in claim 14, further comprising a second bearing member defining said first axis and rigid with said main support means.

References Cited

UNITED STATES PATENTS 3,372,420  3/1968  Barthruff _____ 15—250.17

PETER FELDMAN, Primary Examiner